United States Patent [19]

Cummings

[11] Patent Number: 5,288,170
[45] Date of Patent: Feb. 22, 1994

[54] SLUDGE/WASTE LANDFILL METHOD AND SYSTEM

[75] Inventor: James B. Cummings, Pittsburgh, Pa.

[73] Assignee: Chambers Development Co., Inc., Pittsburgh, Pa.

[21] Appl. No.: 947,046

[22] Filed: Sep. 18, 1992

[51] Int. Cl.$^5$ .............................................. B09B 1/00
[52] U.S. Cl. ................... 405/129; 48/199 A; 210/751
[58] Field of Search .................. 405/129, 128, 52; 210/747, 751, 610, 170, 609, 631, 603; 134/25.1, 25.5, 42; 48/197 A, 197 R

[56] References Cited

U.S. PATENT DOCUMENTS

| | | | |
|---|---|---|---|
| 4,016,073 | 4/1977 | Jordan | 405/129 X |
| 4,323,367 | 4/1982 | Ghosh | 405/129 X |
| 4,518,399 | 5/1985 | Croskell et al. | 405/129 X |
| 4,643,111 | 2/1987 | Jones | 405/129 X |
| 4,670,148 | 6/1987 | Schneider | 405/129 X |
| 4,931,192 | 6/1990 | Covington et al. | 405/129 X |

FOREIGN PATENT DOCUMENTS 3300464 7/1984 Fed. Rep. of Germany ...... 405/129

Primary Examiner—Dennis L. Taylor
Attorney, Agent, or Firm—Ansel M. Schwartz

[57] ABSTRACT

The present invention is a gas-to-energy system featuring beneficial use of sludge in a landfill. The system includes a device for disposing waste in the landfill and a device for disposing sludge in the landfill with the waste. The system also includes a device for collecting gas produced within the landfill from the sludge mixed with the waste and a device for generating electrical energy from the collected gas. The generating device is in fluidic communication with the collecting device. The present invention is also a system for a landfill having a device for disposing waste in a landfill and a device for disposing sludge in the landfill with the waste. The system also includes a device for collecting gas produced within the landfill from the sludge mixed with the waste and a device for separating the gas into components having a common molecular structure. The separating device is in communication with the collecting device. There is also a plurality of containers for containing the components. The containers are in communication with the separating device. The present invention is also a method of operating a landfill. The method is comprised of the steps of disposing sludge in the landfill having waste to form a sludge/waste mixture such that gas production of the sludge/waste mixture during decomposition is greater than gas production that would have resulted during decomposition of the waste only. Then, there is the step of collecting the gas produced by the sludge/waste mixture. Next, there is the step of generating energy by burning the gas. Then, there is the step of converting the energy into work.

25 Claims, 2 Drawing Sheets

SLUDGE/WASTE LANDFILL METHOD AND SYSTEM

FIELD OF THE INVENTION

The present invention relates to landfills and the beneficial use of sludge. More specifically, the present invention relates to adding sludge to waste in a landfill to increase gas production.

BACKGROUND OF THE INVENTION

Methane production from municipal refuse represents a source of energy which is rapidly developing but which remains underutilized at the present time. One of the problems contributing to its underutilization is the small amount of methane which is typically collected relative to the methane generation potential of the refuse.

The present invention provides a method of increasing methane production in a landfill to increase the productivity of existing gas recovery systems or to make the installation of a gas extraction system more attractive in landfills which previously did not produce enough gas to justify the expense of a gas recovery system. Thus, by increasing methane production in a landfill in this manner, gas generated can (1) be placed into an environmentally acceptable end-product, (2) generate revenue for the landfill owner, and (3) encourage the reuse of sludge in a beneficial manner. For instance, the increased methane production can be used as an energy source.

SUMMARY OF THE INVENTION

The present invention is a gas-to-energy system for a landfill. The system comprises means for disposing waste in the landfill and means for disposing sludge in the landfill with the waste. The system is also comprised of means for collecting gas produced within the landfill resulting from the sludge mixed wit the waste and means for generating electrical energy from the collected gas. The generating means is in fluidic communication with the collecting means. Preferably, the generating means includes an electrical generator which burns the gas to produce electricity. Preferably, the means for disposing the waste in the landfill includes at least one truck and/or at least one railroad car. Preferably, the means for disposing sludge in the landfill includes at least one sealable or covered container which can also be transported by truck or train.

In a preferred embodiment, the gas collecting means includes a plurality of gas extraction wells located throughout the landfill, a piping network connected to the extraction wells, pumping means for moving gas produced within the landfill into the piping network and containment means in communication with the piping network for storing collected gas.

The present invention is also a system for a landfill comprising means for disposing waste in a landfill and means for disposing sludge in the landfill with the waste. The system additionally is comprised of means for collecting gas produced within the landfill resulting from the sludge mixed with the waste. There is additionally means for separating the gas into components having a common molecular structure. The separating means is in communication with the collecting means. There is also a plurality of containers for containing the components. The containers are in communication with the separating means.

The present invention is also a method of operating a landfill. The method is comprised of the steps of disposing sludge in the landfill having waste to form a sludge/waste mixture such that gas production of the sludge/waste mixture during decomposition is greater than gas production that would have resulted during decomposition of the waste only. Then, there is the step of collecting the gas produced by the sludge/waste mixture. Next, there is the step of generating energy by burning the gas. Then, there is the step of converting the energy into work. The work can be mechanical work or electrical work. Preferably, the generating energy step includes the step of generating electricity and the converting step includes the step of converting the electricity into work. Preferably, after the collecting step, there is the step of transferring the gas into a container and the generating step includes the step of burning the gas at a location remote from the landfill. For instance, the gas, such as methane, can be collected, redistributed and used for fuel for methane burning motor vehicles.

The present invention is also a method of reusing sludge in a beneficial manner. The method is comprised of the steps of disposing sludge in a landfill to increase decomposition of waste, thereby creating valuable airspace for subsequent disposal activities as well as creating greater amounts of methane for valuable uses.

In an alternative embodiment, after the collecting step, there is the step of separating the gas into components having a common molecular structure. Then, there is the step of storing each of the components into separate containers.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
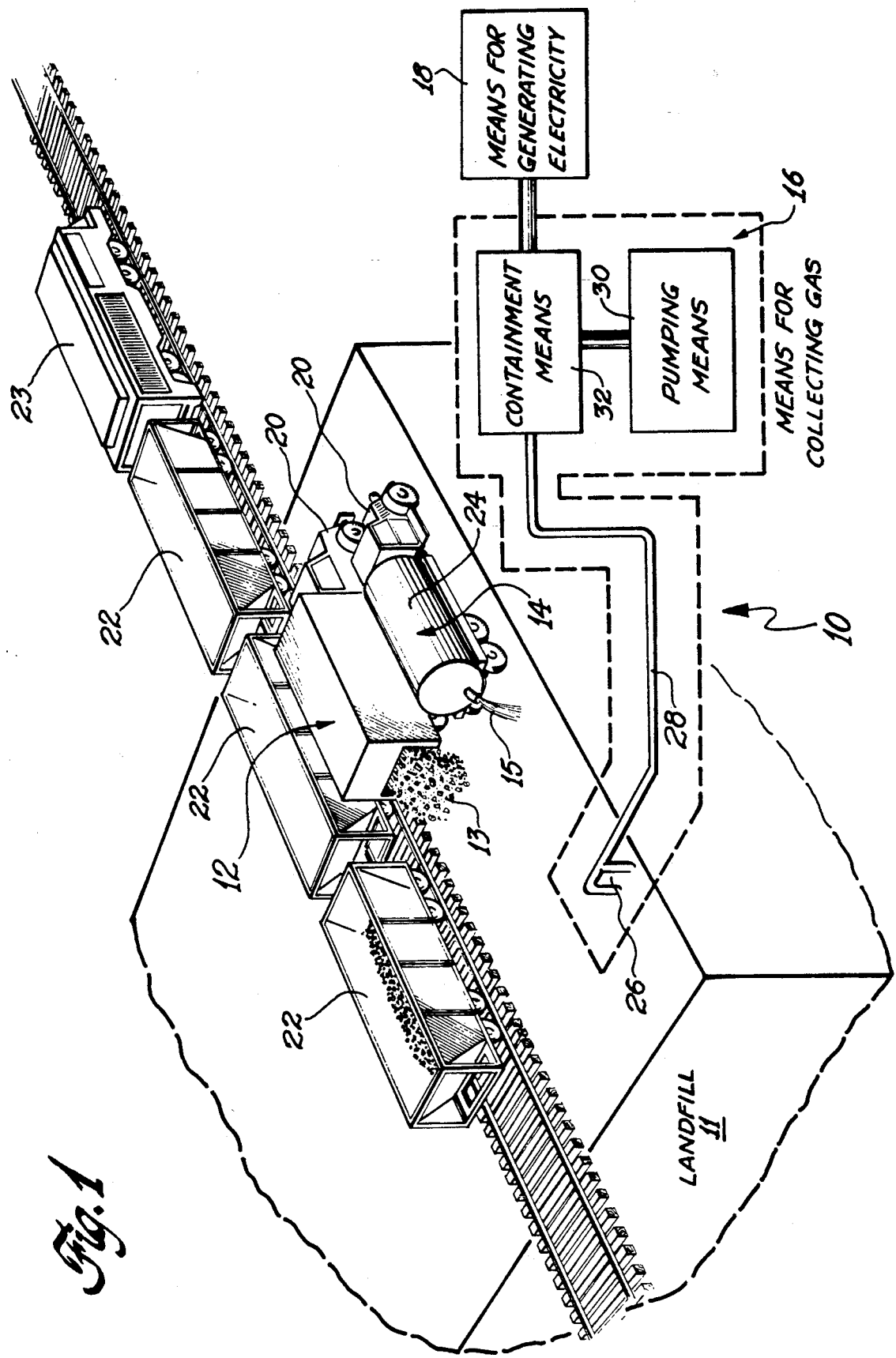
FIG. 1 is a schematic representation showing a gas-to-energy system of the present invention.

Referring now to the drawings wherein like reference numerals refer to similar or identical parts throughout the several views, and more specifically to FIG. 1 thereof, there is shown a gas-to-energy system 10 for a landfill 11. The system 10 is comprised of means 12 for disposing waste 13 in the landfill 11 and means 14 for disposing sludge 15 in the landfill with the waste 13. The system 10 also includes means 16 for collecting gas produced within the landfill from the sludge 15 mixed with the waste 13 and means 18 for generating electricity from the collected gas, such as methane. The generating means 18 is in fluidic communication with the collecting means 16. Preferably, the generating means 18 includes an electrical generator which burns the gas to produce electricity.

The addition of sludge to waste in a landfill produces high rates of methane production. Methane is generated as a product of anaerobic decomposition by methanogenic bacteria. Anaerobic decomposition occurs in almost all organic compounds, with few exceptions, oxidized by the action of strong oxidizing agents under acid conditions. The following formula (1) represents the chemical reactions occurring in anaerobic decompositions.

$$C_nH_aO_bN_c + (n + a/4 - b/2 - 3/4c)O_2 \gg nCO_2 + (a/2 - 3/2C)H_2O + cNH_3 \quad (1)$$

The sludge increases the chemical reaction rate and thus, as a result of anaerobic decomposition, increases methane production by adding methanogenic bacteria (producers) to the waste and the sludge provides high levels of volatile acids which act as a fuel source for the methanogenic bacteria. For a more detailed explanation of the methane production of sludge waste mixtures, see Stamm et al. "Demonstration of Landfill Gas Enhancement Techniques in Landfill Simulators", Eighth Annual Madison Waste Conference, University of Wisconsin-Madison, (1985), or Stamm et al. "Evaluation of the Impacts of Sludge Landfilling", Eighth Annual Madison Waste Conference, University of Wisconsin-Madison, (1985).

Preferably, the means 12 for disposing the waste 13 in the landfill includes at least one truck 20 and/or at least one railroad car 22 of a train 23. Preferably, the means 14 for disposing sludge 15 in the landfill includes at least one sealable or covered container 24 which can also be transported by truck 20 or train 23.

In a preferred embodiment, the gas collecting means includes a plurality of gas extraction wells 26 located throughout the landfill 11, a piping network 28 connected to the extraction wells 26, pumping means 30 for moving gas produced within the landfill 11 into the piping network 28 and containment means 32 in communication with the piping network 28 for storing collected gas.

Figure 2:
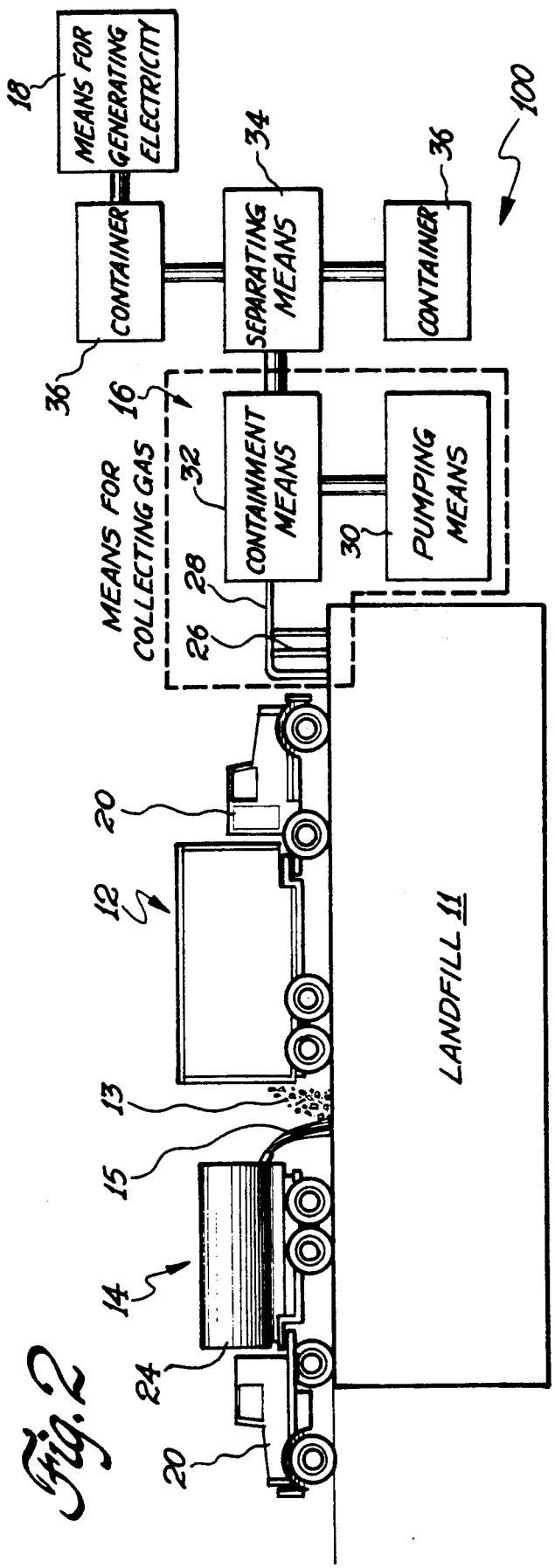
FIG. 2 is a schematic representation showing a preferred embodiment of a gas-to-energy system of the present invention.

The present invention is also a system 100, as shown in FIG. 2, for a landfill comprising means 12 for disposing waste 13 in a landfill and means 14 for disposing sludge 15 in the landfill with the waste 13. The system 100 is also comprised of means 16 for collecting gas produced within the landfill 11 from the sludge 15 mixed with the waste 13 and means 34 for separating the gas into components having a common molecular structure. The separating means 34 is in communication with the collecting means 16. There is also a plurality of containers 36 for containing the components. The containers 36 are in communication with the separating means 34.

In a preferred embodiment, the system 100 includes means 18 for generating electricity from combustible components of the gas such as methane. The generating means 18 is in communication with the containers 36. The collecting means 16 can include a plurality of gas extraction wells 26 located throughout the landfill, piping network 28 connected to the extraction wells 26, pumping means 30 for moving gas produced within the landfill 11 into the piping network 28 and containment means 32 in communication with the piping network 28 for storing collected gas.

Figure 3:
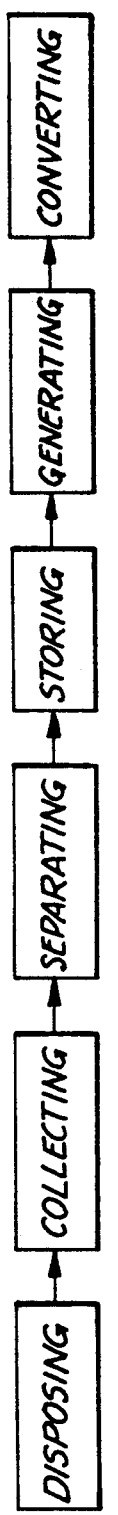
FIG. 3 is a flow chart of a first method of operating a landfill.

As shown in FIG. 3, the present invention is also a method of operating a landfill 11. The method is characterized by the step of disposing sludge 15 in a landfill 11 having waste 13 to form a sludge/waste mixture such that gas production of the sludge/waste mixture during decomposition is greater than gas production that would have resulted during decomposition of the waste only. Then, there is the step of collecting the gas produced by the sludge/waste mixture. Next, there is the step of generating energy by burning the gas. Then, there is the step of converting the energy into work. The work can be mechanical work or electrical work. Preferably, the generating energy step includes the step of generating electricity and the converting step includes the step of converting the electricity into work. Preferably, after the collecting step, there is the step of transferring the gas into a container and the generating step includes the step of burning the gas at a location remote from the landfill. For instance, the gas, such as methane, can be collected, redistributed and used for fuel for methane burning motor vehicles.

Figure 4:
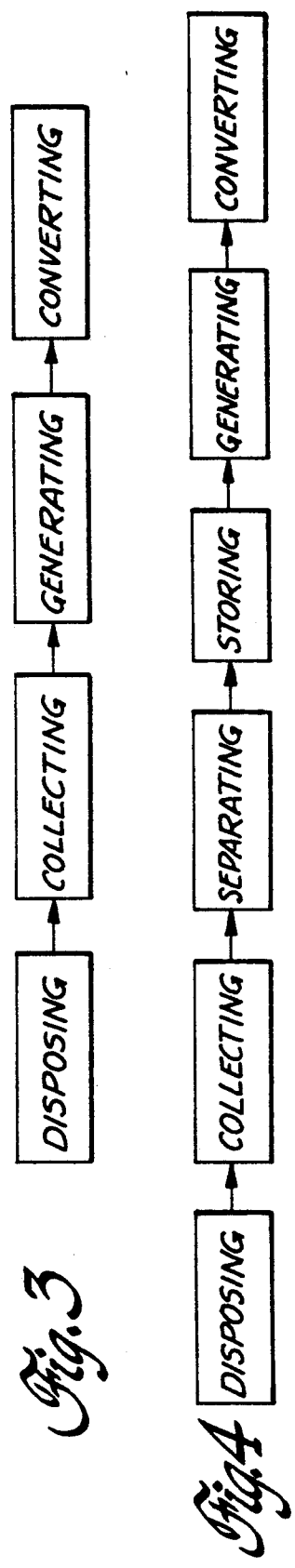
FIG. 4 is a flow chart of a second method of operating a landfill.

As shown in FIG. 4, the present invention is also a method of operating a landfill comprised of the steps of disposing sludge 15 in a landfill 11 having waste 13 to form a sludge/waste mixture such that gas production of the sludge/waste mixture during decomposition is greater than gas production that would have resulted during decomposition of the waste only. Then, there is the step of collecting the gas produced by the sludge/waste mixture. Next, there is the step of separating the gas into components having a common molecular structure. Then, there is the step of storing each of the components into separate containers.

Preferably, after the storing step, there is the step of transporting the containers to a predetermined location. Preferably, after the storing step, there are the steps of generating energy by burning combustible components of the gas and converting the energy into work. The combustible components of the gas can be methane, for instance.

An example of where sludge is combined with municipal waste in a landfill is the Charles City County landfill site Charles City, Va. A ratio of 5 parts municipal waste to 1 part sludge is used at the Charles City County landfill site.

An example of where methane gas is collected in an extraction system of a landfill site is the Monroeville landfill site in Monroeville, Pennsylvania. The extraction system collects the methane gas and directs it to an expulsion point where it is flared.

An example of a landfill site that gathers methane gas for the production of electricity is the Puente Hills energy recovering site in Los Angeles, California. At the Puente Hills energy recovering site, the extraction system collects methane gas and directs it to a gas fired power plant where the gas is burned to operate the engines to produce electricity.

In the operation of the invention, a landfill area 11 is created by known techniques. Municipal waste 13 is then transported to the landfill area 11 with tractor trailers or like transportation devices 20 where it is disposed in the landfill area 11 in piles. The sludge 15 is transported by truck or rail in sealed or covered containers 24 to the landfill area The sludge 15 is also disposed in the landfill area in piles adjacent to the waste piles 13. Computerized tracking at the entrance gate of the landfill verifies that transportation vehicles are bringing five parts waste 13 to one part sludge 13 into the landfill area 11 during the disposing process. That is, five tons of waste 13 to one ton of sludge 15 are allowed into the landfill area 11.

Compactors are then used to mix the piles of waste 13 with the piles of sludge 15 and to distribute the waste/- sludge mixture in the landfill area 11. As a general rule, the drivers of the bulldozers are told to mix ten parts waste per volume with one part sludge per volume since this ratio is roughly equivalent to the desired 5 to 1 waste/sludge ratio in terms of mass.

The liquid content of the five to one waste/sludge ratio in terms of mass is appropriate for five reasons. First, a five to one waste/sludge mixture results in greater methane production than waste 13 only. Second, a five to one waste/sludge mixture avoids leachate problems by too much liquid accumulating in one area. Third, a five to one waste/mixture is stable enough to be formed into piles. If greater amounts of sludge 15 is mixed with the waste 13, the resulting mixture has too much liquid to hold an appropriate form and any mounds of the mixture collapse. Fourth, the five to one waste/sludge mixture prevents sinkholes and potholes from forming over time in the landfill area 11 as the sludge 15 settles, dries and decays. Fifth, a five to one waste/sludge mixture avoids traffic problems within the landfill. If a greater ratio of sludge 15 is mixed with the waste 13, then the landfill area 11 becomes too fluidic for transportation by the trucks of sludge or waste because they become stuck in the surface material.

It should be noted that alternative procedures for placing sludge and municipal waste in a landfill can be accommodated. For instance, layers of sludge 15 and waste 13 can be placed on top of each other. Also, the ratio of waste/sludge can, for instance, be one to one or one hundred to one or any ratio in between. In general, by varying the ratio of sludge 15 to waste 13 the quantity of methane per unit of time can be controlled. For instance, by placing a large amount of sludge in a short period of time in contact with the waste 13, production of methane for a given unit of time is greatly increased until the active sludge/waste relationship becomes neutralized.

Once the landfill area 11 is filled with five parts waste 13 to one part sludge 15 per mass, it is covered as is known in the art. Note the entire landfill area 11 does not need to be filled before covering can commence. A gas collection system 16 is then installed within the landfill area 11 in a phased sequence since methane production does not occur immediately but after a period of time has passed when the sludge 15 and waste 13 are mixed. The collection system 16 is comprised of a plurality of gas extraction wells 26 located throughout the landfill 11, a piping network 28 connected to the extraction wells 26 and a pump 30 for creating a vacuum within the piping network 28 to pull gas emitted by the decomposing waste/sludge mixture into the extraction wells 26. The gas collected by the collection system 16 is moved into containment means 32 for storage or separation. As is well known, the collected gas typically consists of large parts of methane. This methane is a valuable source of energy. The methane gas can be burned directly at the landfill facility, such as in reciprocating engines, to produce electricity or can be transported in containers to a central distribution facility, such as a gas station, for ultimate transferral to the fuel tanks of methane burning vehicles, such as automobiles. In this manner, the by-products of the decomposing waste/sludge mixture can be used as an energy source either at the landfill site 11 or remote from the landfill site 11. Further, it should be appreciated that noncombustible components of the collected gas, such as $CO_2$, can be separated out from the methane and stored in a separate container 36. The $CO_2$ can then be sold to the appropriate vendors.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method of operating a landfill comprising the steps of:

disposing sludge with waste in the landfill during formation of the landfill to form a sludge/waste mixture such that gas production of the sludge/waste mixture during decomposition is greater than gas production that would have resulted during decomposition of the waste only;

collecting the gas produced by the sludge/waste mixture directly from the landfill;

channeling the collected gas from the landfill into a piping network connected to the landfill;

generating energy by burning the gas collected directly from the landfill and channeled through the piping network; and converted the energy into work.

2. A method as described in claim 1 wherein the generating energy step includes the step of generating electricity; and the converting step includes the step of converting the electricity into work.

3. A method as described in claim 1 wherein the work is mechanical work.

4. A method as described in claim 1 wherein the work is electrical work.

5. A method as described in claim 1 wherein after the collecting step, there is the step of transferring the gas into a container.

6. A method as described in claim 5 wherein the generating step includes the step of burning the gas at a location remote from the landfill.

7. A gas-to-energy system for a landfill comprising:

means for disposing waste in the landfill;

means for disposing sludge in the landfill with the waste during formation of the landfill;

means for collecting gas produced within the landfill from the sludge mixed with the waste directly from the landfill;

a piping network connected to the collecting means through which gas from the landfill is channeled; and means for generating electricity from the collected gas, said generating means in fluidic connection with the collecting means through the piping network such that gas collected directly from the landfill is channeled to the generating means.

8. A system as described in claim 7 wherein the generating means includes an electrical generator which burns the gas to produce electricity.

9. A system as described in claim 8 wherein the means for disposing the waste in the landfill includes at least one truck.

10. A system as described in claim 8 wherein the means for disposing the waste in the landfill includes at least one railroad car.

11. A system as described in claim 10 wherein the means for disposing sludge in the landfill includes at least one covered or sealable container.

12. A system as described in claim 11 wherein the collecting means includes a plurality of gas extraction wells located throughout the landfill, a piping network connected to said extraction wells, pumping means for moving gas produced within the landfill into the piping network and containment means in communication with the piping network for storing collected gas.

13. A method of operating a landfill comprising the steps of:
disposing sludge in the landfill having waste to form a sludge/waste mixture such that gas production of the sludge/waste mixture during decomposition is greater than gas production that would have resulted during decomposition of the waste only;
collecting the gas produced by the sludge/waste mixture;
separating the gas into components having a common molecular structure; and
storing each of the components into separate containers.

14. A method as described in claim 13 wherein after the storing step, there is the step of transporting the containers to a predetermined location.

15. A method as described in claim 13 wherein after the storing step, there are the steps of generating energy by burning combustible components of the gas and converting the energy into work.

16. A method as described in claim 15 wherein the generating step includes the step of generating electricity and the converting step includes the step of converting electricity into work.

17. A system for a landfill comprising:
means for disposing waste in a landfill;
means for disposing sludge in the landfill with the waste;
means for collecting gas produced within the landfill from the sludge mixed with the waste;
means for separating the gas into components having a common molecular structure, said separating means in communication with the collecting means; and
a plurality of containers for containing the components, said containers in communication with said separating means.

18. A system as described in claim 17 including means for generating electricity from combustible components of the gas, said generating means in communication with said containers.

19. A system as described in claim 18 wherein the collecting means includes a plurality of gas extraction wells located throughout the landfill, a piping network connected to said extraction wells pumping means for moving gas produced within the landfill into the piping network and containment means in communication with the piping network for storing collected gas.

20. A method of operating a landfill comprising the steps of:
disposing sludge with waste in the landfill to form a sludge waste mixture such that gas production of the sludge/waste mixture during decomposition is greater than gas production that would have resulted during decomposition of the waste only;
installing a plurality of gas extraction wells throughout the landfill in fluidic communication with a piping network;
collecting the gas produced by the sludge/waste mixture with the gas extraction wells;
passing the gas through the piping network to a gas fired power plant;
generating energy by burning the gas; and
converting the energy into work.

21. A method as described in claim 20 wherein the disposing step includes the step of placing sludge with waste in a landfill during formation of the landfill.

22. A method as described in claim 21 including after the placing step, there is the step of covering the landfill with a cover.

23. A gas-to-energy system for a landfill comprising:
means for disposing waste in the landfill;
means for disposing sludge in the landfill with the waste;
means for collecting gas produced within the landfill directly from the landfill;
a piping network connected to the collecting means through which gas collected from the landfill can flow;
pumping means for moving gas produced within the landfill into the piping network; and
means for generating electricity from the collected gas, said generating means in fluidic connection with the piping network so gas collected from the landfill can be received by the generating means.

24. A gas-to-energy system as described in claim 23 wherein the means for disposing sludge in the landfill with the waste includes means for disposing the sludge with the waste during formation of the landfill.

25. A system as described in claim 24 wherein the generating means includes a gas fired power plant.

* * * * *

UNITED STATES PATENT AND TRADEMARK OFFICE
CERTIFICATE OF CORRECTION

PATENT NO. : 5,288,170
DATED : February 22, 1994
INVENTOR(S) : James B. Cummings It is certified that error appears in the above-indentified patent and that said Letters Patent is hereby corrected as shown below:

Column 1, line 40, change "wit" to -- with -- .

Column 6, line 27, change "converted" to -- converting -- .

Signed and Sealed this

Eighteenth Day of October, 1994

Attest:

BRUCE LEHMAN

Attesting Officer Commissioner of Patents and Trademarks